(12) United States Patent
Hawkins et al.

(10) Patent No.: US 12,338,794 B2
(45) Date of Patent: Jun. 24, 2025

(54) MITIGATING STANDSTILL VIBRATIONS OF A WIND TURBINE

(71) Applicant: Siemens Gamesa Renewable Energy A/S, Brande (DK)

(72) Inventors: Samuel Hawkins, Vejle (DK); Jesper Winther Staerdahl, Sunds (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 23 days.

(21) Appl. No.: 17/794,288

(22) PCT Filed: Jan. 11, 2021

(86) PCT No.: PCT/EP2021/050397
§ 371 (c)(1),
(2) Date: Jul. 21, 2022

(87) PCT Pub. No.: WO2021/151643
PCT Pub. Date: Aug. 5, 2021

(65) Prior Publication Data
US 2023/0066258 A1     Mar. 2, 2023

(30) Foreign Application Priority Data
Jan. 29, 2020    (EP) .................................... 20154371

(51) Int. Cl.
*F03D 7/02*      (2006.01)
*F03D 17/00*     (2016.01)

(52) U.S. Cl.
CPC ......... *F03D 7/0296* (2013.01); *F03D 7/0204* (2013.01); *F03D 7/0212* (2013.01);
(Continued)

(58) Field of Classification Search
CPC .... F03D 7/0204; F03D 7/0208; F03D 7/0212; F03D 7/0264; F03D 7/0268; F03D 7/0269; F03D 7/0298
See application file for complete search history.

(56) References Cited

U.S. PATENT DOCUMENTS

| | | | | |
|---|---|---|---|---|
| 4,298,313 A | * | 11/1981 | Hohenemser | ......... F03D 7/0212 416/11 |
| 7,952,217 B2 | * | 5/2011 | Nielsen | ................. F03D 7/0224 290/55 |

(Continued)

FOREIGN PATENT DOCUMENTS

| | | |
|---|---|---|
| CN | 105899804 A | 8/2016 |
| CN | 107223183 A | 9/2017 |

(Continued)

OTHER PUBLICATIONS

PCT International Search Report and Written Opinion of International Searching Authority mailed Apr. 20, 2021 corresponding to PCT International Application No. PCT/EP2021/050397 filed Jan. 11, 2021.

*Primary Examiner* — Woody A Lee, Jr.
*Assistant Examiner* — Behnoush Haghighian
(74) *Attorney, Agent, or Firm* — Schmeiser, Olsen & Watts, LLP

(57) ABSTRACT

A method of mitigating a vibration of a wind turbine not receiving power from to a utility grid includes: receiving power from an energy storage system of the wind turbine; utilizing the power received from the energy storage system: to detect a wind direction and to adjust an orientation of the rotor axis of a rotor shaft, if a criterion is satisfied taking into account at least the relative orientation of the rotor axis and the detected wind direction and/or taking into account a level of the vibration.

18 Claims, 1 Drawing Sheet

(52) U.S. Cl.
CPC .......... *F03D 7/0224* (2013.01); *F03D 7/0268* (2013.01); *F03D 17/00* (2016.05); *F05B 2260/96* (2013.01); *F05B 2270/32* (2013.01); *F05B 2270/321* (2013.01); *F05B 2270/334* (2013.01)

(56) References Cited

U.S. PATENT DOCUMENTS

| | | | | |
|---|---|---|---|---|
| 8,360,723 | B2 * | 1/2013 | Veldkamp | F03D 7/042 416/155 |
| 8,362,632 | B2 * | 1/2013 | Nielsen | F03D 7/0204 290/55 |
| 8,749,084 | B2 * | 6/2014 | Gjerlov | F03D 7/0268 290/44 |
| 8,987,930 | B2 * | 3/2015 | Matzen | H02P 9/10 290/44 |
| 10,823,141 | B2 * | 11/2020 | Danielsen | F03D 7/042 |
| 10,871,144 | B2 * | 12/2020 | Tomas | F03D 7/0212 |
| 11,448,186 | B2 * | 9/2022 | Danielsen | F03D 7/0284 |
| 11,608,812 | B2 * | 3/2023 | Arroyo Beltri | G01M 1/00 |
| 2007/0018457 | A1 | 1/2007 | Llorente Gonzalez | |
| 2009/0250932 | A1 | 10/2009 | Egedal | |
| 2010/0301605 | A1 * | 12/2010 | Nielsen | F03D 7/0224 290/44 |
| 2011/0076142 | A1 * | 3/2011 | Veldkamp | F03D 7/0224 416/31 |
| 2012/0217748 | A1 * | 8/2012 | Gjerlov | F03D 7/0268 290/44 |
| 2013/0175801 | A1 * | 7/2013 | Matzen | H02P 9/10 290/44 |
| 2014/0241882 | A1 | 8/2014 | Caruso et al. | |
| 2016/0377057 | A1 | 12/2016 | Caponetti et al. | |
| 2018/0266391 | A1 * | 9/2018 | Danielsen | F03D 7/0284 |
| 2020/0173418 | A1 * | 6/2020 | Arroyo Beltri | F03D 7/0296 |
| 2023/0175487 | A1 * | 6/2023 | Motta | F03D 7/0224 416/1 |
| 2023/0175489 | A1 * | 6/2023 | Danielsen | F03D 7/0296 416/1 |

FOREIGN PATENT DOCUMENTS

| | | |
|---|---|---|
| CN | 110185581 A | 8/2019 |
| CN | 110630438 A | 12/2019 |
| EP | 2107236 A1 | 10/2009 |
| EP | 2483555 A2 | 8/2012 |

* cited by examiner

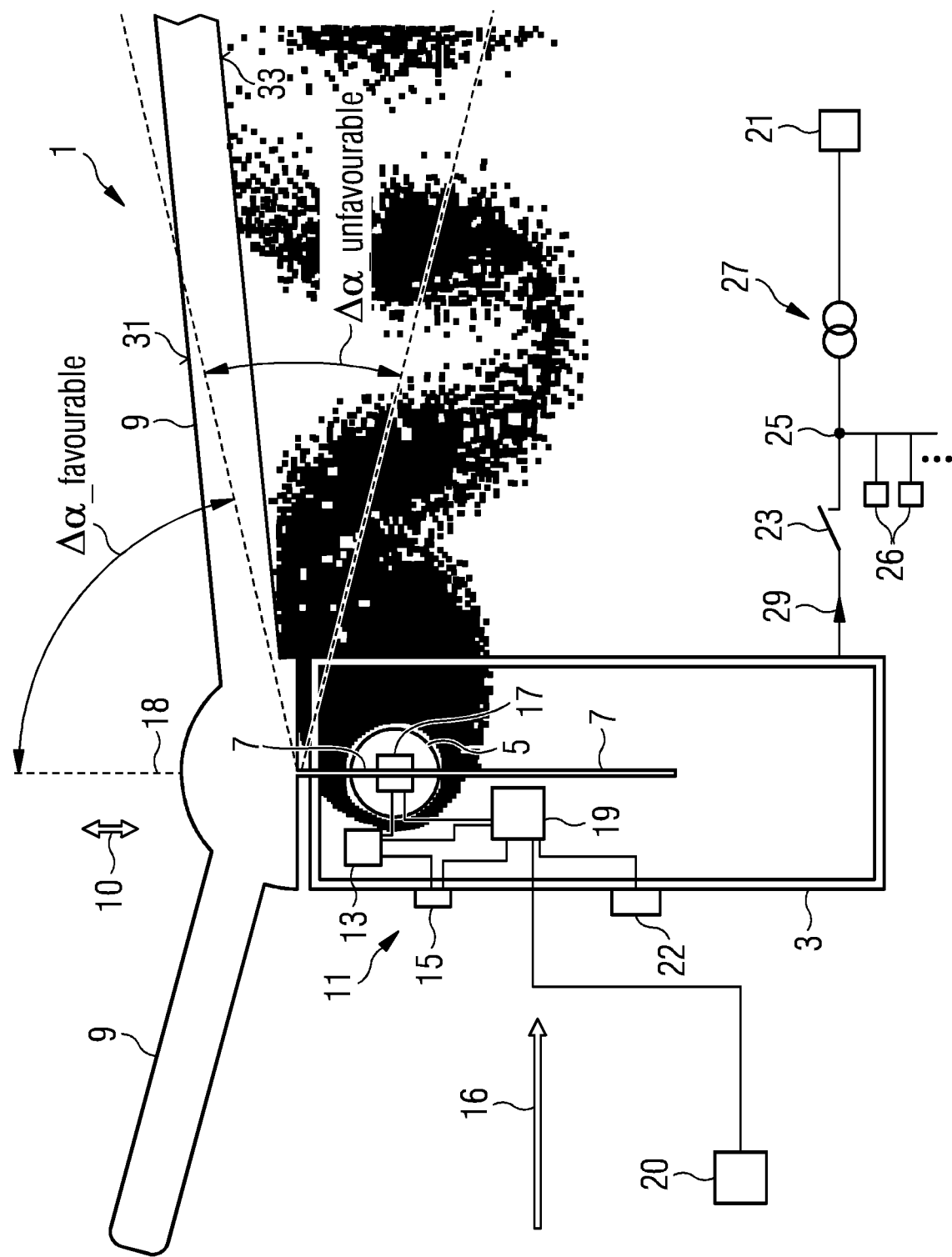

MITIGATING STANDSTILL VIBRATIONS OF A WIND TURBINE

CROSS-REFERENCE TO RELATED APPLICATIONS

This application claims priority to PCT Application No. PCT/EP2021/050397, having a filing date of Jan. 11, 2021, which claims priority to EP Application No. 20154371.7, having a filing date of Jan. 29, 2020, the entire contents both of which are hereby incorporated by reference.

FIELD OF TECHNOLOGY

The following relates to a method and to an arrangement of mitigating, in particular standstill, vibrations of a wind turbine not receiving energy from a utility grid and further relates to a wind turbine comprising the arrangement.

BACKGROUND

A wind turbine comprises a wind turbine tower, a nacelle mounted on top of the wind turbine tower, wherein in the nacelle a rotor shaft drives an electric generator. At the rotor shaft, plural rotor blades are mounted. In situations of a fault in a utility grid or in other circumstances, the wind turbine may not receive power from the utility grid in order to operate particular components of the wind turbine such as a yawing system and blade pitching system. When the wind turbine is not connected to a utility system, the wind turbine may be idle and may in particular stop operation through use of a braking device. In either situation the wind turbine is considered to be at standstill.

Standstill vibrations, such as vortex induced vibrations, of a wind turbine tower may occur at specific wind speeds during standstill when the wind turbine is not in operation. These vibrations may occur at all rotor alignments, but the hazardous build-up of these vibrations most frequently occurs when the alignment of the rotor is not aligned with the incoming wind direction, wherein the rotor is considered to be aligned if the rotor plane is perpendicular to the incoming wind direction, or equivalent to the rotor shaft being parallel to the wind direction.

Standstill vibrations initiating at the rotor blades may occur due to unsteady aerodynamics of airfoils at large angles of attack. During operation, the rotor blades of a wind turbine typically operate such that the airfoils which comprise the blade interact with the wind at small angles of attack. During standstill and at specific wind speeds, the wind may interact with these airfoils at large angles of attack. The unsteady aerodynamics associated with these large angles of attack often result in a decrease in aerodynamic damping and in some cases negative damping.

Traditionally, a wind turbine in a fully functioning state will align the rotor with the wind to reduce overall loading hereby minimizing risk of vibration build-up due to high blade damping. However, in the above mentioned off-grid situations, where the turbine is unable to track wind direction and activate the yaw system to align the rotor and nacelle, the turbine might be in situations where vibration can occur in low damped directions with a high risk of catastrophic vibration build-up.

Traditionally, in order to avoid standstill vibrations for wind turbines in off grid scenarios, passive solutions have been applied. This has included energy damping solutions such as tuned mass dampers and slosher dampers. Solutions have also been used which avoid the build-up of vibrations, such as installing helical strakes or other flow disturbance arrangements around the tower and blades. These have been applied both as a temporary measure and as a permanent fixed solution.

Another method of avoiding standstill vibrations in off grid scenarios is through the inherent design of the wind turbine. The at-rest position of components (such as the pitch orientation of the blades at standstill) can be designed to minimize these vibrations. The structure itself can provide some amount of damping as can the interaction between the foundation and the soil. Similarly, the wind turbine can be designed such that the natural frequencies of the structures do not align or match with the dominant frequencies of the vortices or other forms of unsteady aerodynamics created by the wind turbine.

However, there are negative consequences associated with these passive solutions, in that they nearly always involve additional weight, complexity, or cost to the wind turbine.

Thus, there may be a need for a method and a corresponding arrangement of mitigating in particular standstill vibrations of a wind turbine which is not receiving power from a utility grid so that damage of wind turbine components may be avoided and such that the above-mentioned negative consequences may also be avoided.

SUMMARY

According to an embodiment of the present invention it is provided a method of mitigating a vibration of a (in particular standstill) wind turbine (in particular not connected to a utility grid) not receiving power from a utility grid, the method comprising: receiving power from an energy storage system of the wind turbine; utilizing the power received from the energy storage system: to detect a wind direction and to adjust an orientation (in particular using a yawing system) of the rotor axis of a rotor shaft (to be in a favourable orientation with respect to the detected wind direction) if a criterion is satisfied taking into account at least the relative orientation of the rotor axis and the detected wind direction and/or taking into account a level of the vibration.

Standstill vibration may refer to all types of vibrations which might happen at standstill such as mentioned above. Vortex induced vibrations (ViV) of the tower are one type, but others exist such as unsteady aerodynamics of blade airfoils in deep stall.

A wind turbine at standstill may refer to a wind turbine at rest with or without a braking device applied, i.e., a standstill turbine may also be slowly (rotating) idling.

The method may be executed or performed by an arrangement for mitigating a vibration of a wind turbine according to an embodiment of the present invention. The method may for example be performed by a controller implementing the arrangement, the controller being an entire wind turbine controller or being part of a wind turbine controller. The vibration may relate in particular to a vortex induced vibration or a vibration involving oscillating movements of the tower, blades and/or the nacelle.

In order to avoid this situation, energy received from the energy storage system may be utilized to adjust the orientation of the rotor axis of the rotor shaft such as to be in a favourable orientation with respect to the detected wind direction. A favourable orientation may for example be obtained when the wind direction is at least approximately parallel to the direction of the rotor axis. The favourable orientation may be the desired orientation during disconnection from the utility grid and during standstill of the wind turbine. Thereby, also the rotor blades may be pitched to be in a feathered position such that a leading edge of the blade faces the wind.

The energy storage system may be implemented in different configurations as will be explained below. The energy storage system may provide electric energy to a wind direction sensor and the yawing system which is configured to adjust the orientation of the rotor axis. The detected wind direction may relate to the actual (three dimensional) wind direction, or the wind direction projected onto a horizontal plane (thus being two dimensional).

The criterion is based on the relative (three dimensional or two dimensional projected) orientation of the rotor axis and the detected wind direction and/or level of vibration. The criterion may be based on further factors as will be explained below. Not only vortex induced vibration in a direction parallel to the rotor axis, but also other kinds of vibrations may be damped or mitigated when the wind turbine is adjusted such that the rotor axis direction substantially coincides or is more closely aligned with the wind direction (at least projected onto a horizontal plane). Thereby, components of the wind turbine may be protected from potential damage. Furthermore, energy resources of the energy storage system may be saved when the orientation of the rotor axis is adjusted only if the criterion is satisfied. Thereby, effective damping may be provided and mitigating or even avoiding potentially dangerous vibrations of portions of the wind turbine including in particular the tower, blades and/or the nacelle may be achieved.

Yawing may be performed not only if there is a certain yaw misalignment beyond a certain threshold, but also if vibrations are detected, e.g., larger than a vibration threshold. E.g., if a vibration level builds up the wind turbine may be yawed towards alignment between rotor axis and wind direction (e.g. towards a more favourable orientation).

This may provide two layers of protection: By using the orientation as a part of the criterion the occurrence of vibrations may be prevented and by measuring the vibrations and taking into account the level of vibration it may be reacted to the vibrations in case they occur.

According to an embodiment of the present invention, the orientation of the rotor axis is not adjusted if the criterion is not satisfied and/or wherein the criterion comprises that there is an unfavourable orientation of the wind direction relative to the rotor axis direction or that there is the build-up of vibrations.

Thus, the orientation of the rotor axis may only be adjusted if the orientation of the rotor axis relative to the detected wind direction would lead to an unfavourable situation potentially allowing excitation of potentially dangerous vibrations or if vibrations are detected. Thereby, energy resources of the energy storage system may be saved for other more dangerous situations or circumstances.

The unfavourable orientation of the wind direction relative to the rotor axis direction may be a setting, which includes the risk of exciting a vibration of the nacelle and the tower in a direction aligned with or being colinear with the rotor axis. The orientation of the rotor axis may be adjusted such that the unfavourable orientation is not present any more. Additionally, passive measures to dampen already existing vibrations may be applied which have been described above.

According to an embodiment of the present invention, the unfavourable orientation is defined by an angle $\alpha$ between the wind direction and the rotor axis direction satisfying: $120°>\alpha>60°$, in particular $110°>\alpha>70°$, further in particular $100°>\alpha>80°$.

The angle $\alpha$ may be defined as an angle including the wind direction and the rotor axis direction both projected onto a horizontal plane. Thereby, a simple method for defining the unfavourable orientation is provided which may be utilized in a simple implementation of the method. An angle $\alpha$ of approximately 90° may be considered as a most unfavourable orientation, since in this situation, the wind direction is perpendicular to the direction of the rotor axis which may be equivalent to the statement that the wind direction lies within the plane of the rotor blades. The plane of the rotor blades may be substantially perpendicular to the direction of the rotor axis. The angle range $\Delta\alpha\_unfavourable$ defining the unfavourable orientation may also depend on a wind speed which may be measured and accounted for in other embodiments.

In particular, the higher the wind speed the larger the range of angle values defining the unfavourable orientation. Thus, embodiments of the present invention may set the particular range defining the unfavourable orientation in dependence of the wind speed.

According to an embodiment of the present invention, a favourable orientation is defined by an absolute value $\alpha\_absolute$ of the angle $\alpha$ between the wind direction and the rotor axis direction satisfying: $\alpha\_absolute<70°$, wherein the orientation of the rotor axis is not adjusted if a favourable orientation is present. Thereby, a favourable angle range $\Delta\alpha\_favourable$ may be defined.

When the angle between the wind direction and the rotor axis is substantially 0°, a most favourable orientation may be present which to a maximal extent may mitigate the vibration, in particular vortex induced vibration being an oscillatory movement of the nacelle and parts of the tower in a direction parallel to the rotor axis. If the orientation of the rotor axis is not adjusted if a favourable orientation is present, energy resources of the energy storage system may be saved in particular for situations where an unfavourable orientation may be present in the future.

According to an embodiment of the present invention, the method further comprises detecting a wind speed, wherein the criterion further comprises that the wind speed is in an unfavourable wind speed range, in particular depending on the wind direction relative to the rotor axis direction.

The higher the wind speed the more strongly a dangerous vibration may be induced or excited when an unfavourable orientation is present. In particular, when the wind speed is not in an unfavourable wind speed range, the axis of the rotor may not be adjusted to be in a favourable orientation, thereby saving energy in the energy storage system. For example, if the wind speed is lower than a particular threshold, no adjustment of the orientation of the rotor axis needs to be performed even if the actual orientation is an unfavourable orientation. Whether the wind speed is in an unfavourable wind speed range may depend on the wind direction relative to the rotor axis direction. Thereby, considering also the wind speed may in an even improved way protect components of the wind turbine while saving energy of the energy storage system.

According to an embodiment of the present invention, plural unfavourable wind speed ranges are defined in association with different orientations of the wind direction relative to the rotor axis direction, wherein the criterion further comprises that one of the unfavourable wind speed ranges associated with the respective orientation is present, wherein at least one of unfavourable wind speed ranges is in particular defined in that the wind speed is greater than a threshold depending on the orientation.

For example, for any given orientation of the wind direction relative to the rotor axis direction, an associated wind speed range may be defined which represents an unfavourable situation, in particular meaning a situation where excitation of unwanted or undesired vibration may occur. Thereby, a multi-dimensional logic may be implemented defining under which circumstances involving orientation of the rotor axis relative to the wind direction and also considering wind speed a readjustment of the direction of the rotor axis is to be performed. Thereby, effective protection of components of the wind turbine may be achieved as well as saving energy of the energy storage system.

According to an embodiment of the present invention, the criterion further comprises that rotor blades mounted at the rotor shaft are pitched to be in a feathered position or at least deviating from a feathered position by at most 20°, in particular 10°, further in particular 5°. The feathered position may be a position in which an upstream edge of the rotor blade faces the wind, when the wind impacts in a direction parallel to the rotor axis towards the hub of the wind turbine at which the rotor blades are mounted. The feathered position may be the standard idle pitch position of the rotor blades. In the feathered position, impacting wind (from the front) will lead to limited rotation of the rotor, also referred to as idling rotation. When in the feathered position the wind turbine may be prone to be excited into a vortex induced vibration since the damping of a vibration parallel to the rotor axis may be minimal. However, the feathered position has to be adopted, since during disconnection from the utility grid it may be desired or even necessary to keep the wind turbine standing still.

According to an embodiment of the present invention the energy storage system may provide electric energy to one or multiple sensors capable of detecting motion, in particular vibration involving oscillating movements of the tower, blades and/or the nacelle. The method further comprises measuring, in particular using one or more accelerometers and/or strain sensors and/or inclinometers, a strength of the vibration of a portion of the wind turbine, in particular in the location where vibrations are expected to be greatest, e.g. top part of the tower or nacelle or blades, wherein the criterion comprises that the strength of the vibration is larger than a vibration strength threshold, in particular depending on the unfavourable wind speed range and/or unfavourable orientation. This embodiment further may save energy of the energy storage system, since only in the case the measured vibration is considerable or in particular above the vibration strength threshold reducing the vibration may be necessary. In other cases, the vibration may be so small that even when in an unfavourable orientation and/or in a unfavourable wind speed range, readjustment of the rotor axis direction may not be necessary. Thereby, energy of the storage system may be saved for more dangerous situations. The vibration strength threshold may be set to be the lower the higher the detected wind speed and/or the more unfavourable the orientation of the rotor axis is relative to the wind direction.

In the event that the axis of the rotor is not in an unfavourable orientation relative to the wind direction but is not in full alignment (most favourable orientation) with the wind direction, then the detection of vibration beyond a predetermined threshold may cause an adjustment of the orientation of the rotor axis toward closer alignment with the wind direction.

Even if the yaw orientation is outside the "unfavourable zone" it may still be necessary to yaw closer to the wind direction if vibration build up is detected. Thereby "fail safe" behaviour may result e.g., in case the "unfavourable zone" is not large enough.

According to an embodiment of the present invention, measuring the strength of a vibration comprises detecting a oscillating motion of the tower, blades and/or the nacelle, the method in particular further comprising: filtering the measured strength of the vibration to extract a strength of standstill vibration. The oscillating motion of the tower, blades and/or the nacelle may be identified or detected due to a pre-known or at least calculable frequency which is expected for such a oscillation. The expected frequency of the oscillation may be calculated using physical characteristics of the wind turbine tower and the nacelle and the rotor blades, in particular taking into account mass, material, geometry and structural properties. The filtering may in particular comprise frequency filtering. A fundamental mode or one or more higher harmonic modes of the oscillation may be detected.

According to an embodiment of the present invention, the energy storage system comprises a generator powered by a combustion engine, in particular Diesel motor, and/or a battery system and/or a fuel cell. Thereby, conventionally available energy storage systems may be supported. The electric energy provided by the energy storage system may be appropriately transformed to a desired voltage and/or converted to have a desired frequency, as is necessary for the yawing system and/or a wind direction/speed detector and/or vibration detection systems.

According to an embodiment of the present invention, the method further comprises determining a remaining energy capacity of the energy storage system; sending information about the remaining energy capacity to an operator, in particular if the remaining energy capacity is less than an energy threshold. In particular, depending on the remaining energy capacity of the energy storage system, the above-mentioned unfavourable or favourable orientations and unfavourable angle ranges or wind speed ranges may be selected. Thus, for less and less remaining energy capacity determined for the energy storage system, the orientation of the rotor axis may only be adjusted, if in a more and more unfavourable orientation or unfavourable situation. When the information about the remaining energy capacity is sent to an operator, the operator may take measures to recharge the energy storage system before the energy storage system does not comprise any energy anymore.

According to an embodiment of the present invention, the method further comprises recharging the energy storage system using energy provided by the rotating wind turbine rotor, in particular via a wind turbine generator, in particular only if the remaining energy capacity is less than the energy threshold. When the energy storage system is recharged using energy provided by the rotating wind turbine rotor, the wind turbine may be prepared for a potential future disconnection from the utility grid. The recharging may for example be performed when the available power producible by the wind turbine is larger than the power as required by a wind turbine operator or grid operator.

It should be understood that features, individually or in any combination, described, disclosed, explained or provided for a method of mitigating a vibration of a wind turbine may also be applied, individually or in any combination, to an arrangement for mitigating a vibration of a wind turbine according to an embodiment of the present invention and vice versa.

According to an embodiment of the present invention it is provided an arrangement for mitigating a vibration of a wind turbine not receiving power from a utility grid, the arrangement comprising: an energy storage system of the wind turbine; a wind direction sensor; in particular one or more vibration sensors; a yawing system; a processor, wherein the arrangement is adapted to supply power received from the energy storage system: to the wind direction sensor and/or vibrations sensors to detect a wind direction, and level of vibrations, respectively, and to the yawing system to adjust an orientation of the rotor axis of a rotor shaft if the processor determines that a criterion is satisfied taking into account at least either the relative orientation of the rotor axis and the detected wind direction or taking into account the level of vibrations.

The arrangement may for example be a software and/or hardware portion of a wind turbine controller and/or other components of the wind turbine. The processor may for example be a software portion or a hardware portion of a wind turbine controller. A yawing system and a wind direction sensor and vibration sensors may be available or included in a conventionally available wind turbine. The arrangement may comprise a switching system or switching capability for being able to selectively supply electric energy from the utility grid to the yawing system during normal operation or supply energy from the electric storage system to the yawing during disconnection from the utility grid in particular during standstill of the wind turbine.

Embodiments of the present invention may detect vibrations and yaw, and/or pitch the blades (and/or rotate the rotor) until vibrations are lowered.

Furthermore, a wind turbine including the arrangement as explained above is provided according to an embodiment of the present invention.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following FIGURES, wherein like designations denote like members, wherein:

The FIGURE schematically illustrates a wind turbine according to an embodiment of the present invention.

DETAILED DESCRIPTION

The FIGURE schematically illustrates a wind turbine according to an embodiment of the present invention including an arrangement for mitigating a vibration of a wind turbine according to an embodiment of the present invention which is adapted to carry out a method of mitigating a vibration of a wind turbine according to an embodiment of the present invention.

The wind turbine 1 according to an embodiment of the present invention illustrated in the FIGURE includes a nacelle 3 mounted on top of a wind turbine tower 5, wherein the wind turbine nacelle 3 harbours a rotor shaft 7 at which plural rotor blades 9 are mounted. The wind turbine further comprises an arrangement 11 for mitigating a vibration 10 of a wind turbine according to an embodiment of the present invention. The arrangement 11 comprises an energy storage system 13, a wind direction sensor 15 and one or more vibration sensors 22, a yawing system 17 and a processor 19.

The arrangement 11 is adapted to supply power received from the energy storage system 13 to the wind direction sensor 15 to detect a wind direction and to one or more vibration sensors 22 to detect (e.g. a level of) oscillating motion of the tower, blades and/or the nacelle, and to the yawing system 17 to adjust an orientation of the rotor axis 18 (around which the rotation shaft 7 rotates) if the processor 19 determines that a criterion is satisfied taking into account at least the relative orientation of the rotor axis 18 and the detected wind direction 16 and/or taking into account the vibration level. Thereby, the energy storage system 13 provides energy to the wind direction sensor 15 as well as to the yawing system 17 in a case where the wind turbine 1 is disconnected from a utility grid 21 and in particular does not receive any energy from the utility system 21.

As can be taken from the FIGURE, a breaker 23 connecting the wind turbine 1 during normal operation to a point of common coupling 25 to which potentially plural other wind turbines 26 are connected is opened such that the wind turbine 1 is disconnected from the utility grid 21 which is connected to the point of common coupling 25 via a wind park transformer 27. The wind turbine 1 comprises a not illustrated generator which is driven by the rotor shaft 7 and which outputs AC power 29 during normal operation.

However, the method carried out by the arrangement 11 of mitigating a vibration 10 of the wind turbine is performed during disconnection from the utility grid 21 in particular during standstill of the wind turbine 1, i.e., while the rotation shaft 7 is not rotating or is slowly rotating/idling. The method avoids a vibration involving an oscillating movement 10 of the nacelle 3 and parts of the tower 5 in a direction aligned with the direction of the rotor axis 18. A vibration, in particular vortex induced vibration, in this direction 18 is in particular excited when the wind direction 16 is substantially perpendicular to the rotor axis 18. Furthermore, depending on the wind speed, also a vibration along the rotor axis direction 18 is excited when there is an unfavourable orientation of the wind direction relative to the rotor axis direction 18, in particular in an angle range Δα_unfavourable. When the wind direction 16 is in an angle range Δα_unfavourable, an unfavourable orientation of the wind direction 16 relative to the rotor axis direction 18 is present potentially exciting undesired vibrations in the direction of the rotor axis 18. This angle range may be defined by an angle α between the wind direction 16 and the rotor axis 18 satisfying $110° > α > 70°$, for example. Depending on the wind speed, this unfavourable orientation range may be defined by other angle ranges. A favourable orientation range of the wind direction 16 and the rotor axis direction 18 may be denoted as Δα_favourable which may be defined in that the deviation of the wind direction from the direction of the rotor axis 18 is for example less than 70°.

In particular, the wind direction sensor 15 may also be capable of measuring a wind speed and the decision whether to adjust the orientation of the rotor axis 18 may also depend (beside the relative orientation of the rotor axis 18 and the wind direction 16) on the value of the measured wind speed. During the idle state, in particular standstill, of the rotor 7, the rotor blades 9 may be pitch adjusted such that a leading edge 31 is oriented at a front plane and a trailing edge 33 as is arranged at a back plane. This pitch position is also referred to as a feathered position producing limited driving force to the rotor even if wind hits at the front plane.

During normal operation, the energy storage system 13 may be recharged using energy evolving from the rotating rotor, in particular provided by the generator of the wind turbine upon rotation of the rotor 7.

Below, further details according to embodiments of the present invention are described. It should be understood that these details represent in general optional features not necessarily included in all embodiments according to the present invention.

The wind turbine 1 is designed with an energy storage system 13, capable of providing power to the wind turbine's auxiliary systems in the event of a loss of power from the grid or network. At a minimum this energy storage system provides power to a wind direction sensing system 15 and/or one or more vibration sensors, a controller or processor 19, and a system 17 for aligning the orientation of the rotor plane (i.e., a yaw system).

In the most simplistic application, this energy storage system becomes active in the event of a loss of grid power to the wind turbine. While in this off-grid situation, the wind direction sensing system determines the predominate wind direction. An unfavourable range of rotor alignments relative to the wind direction is included as information within the controller (e.g. in an electronic storage of processor 19). If the relative wind direction is in proximity to an unfavourable alignment range then the controller commands the yaw system to adjust the alignment of the rotor. The unfavourable range may be by a deviation of +/−70° deg. away from the predominate wind direction. The unfavourable range may also be biased to wind from the left-hand or right-hand side of the rotor plane and may also consist of multiple ranges. For example, it may be unfavourable to have an alignment 70° to 110° deg. and −60° to −120° relative to the wind direction.

A further embodiment of this invention also includes to measure the wind speed. In this way, the controller determines when the wind speed is in an unfavourable range in combination with the relative wind direction. In this way, energy is conserved if the wind speed is outside of the range where standstill vibrations are likely. Similarly, the controller may include a dynamic set of unfavourable ranges of relative wind directions which are determined as a function of the wind speed in order to avoid standstill vibrations and to conserve energy in the most optimal way.

A further embodiment of this invention also includes to measure the vibration or motion of the wind turbine structure at any location with either a single sensor or a plurality of sensors. In this way, the motion of the wind turbine will be monitored by the controller to detect the early occurrence of standstill vibrations. This monitoring can be combined with one or both of the previous embodiments, such that the alignment of the rotor is only changed if early occurrence of standstill vibrations is detected. This further conserves energy, while preserving the wind turbine structure. The early occurrence of standstill vibrations may be detected using accelerometers, strain measurements, inclinometers, or any other sensor technology capable to detecting the motion of wind turbine components. In a most simplistic application, the sensors are capable of detecting vibrations at the top of the wind turbine tower representing the first fundamental mode of vibration. This motion detection involves the use of digital signal filtering to monitor only the frequency associated with this mode of vibration and therefore avoid reacting to motion not associated with ViV.

According to an embodiment only the level of vibrations is evaluated and the yaw alignment is adjusted based on that, regardless of the criteria relating to "unfavorable range". Measurement of wind direction may still be necessary to align with the wind, but for the decision to yaw or not to yaw "favorable" and "unfavorable zones" may not have relevance.

A further embodiment of this invention involves one or more sensors placed at different locations and used to detect the first fundamental mode of vibration along with additional higher-order modes and also the vibrations of other wind turbine components including the blades. In this way, the motion detection involves filtering for multiple frequencies.

The energy storage system 13 may be comprised of a Diesel (or other fuel) powered generator, configured to turn on and off automatically in the event of a grid loss, or a battery storage system or a fuel cell or any other form of energy storage. In the most simplistic application, the energy storage system has sufficient energy capacity to provide energy for a known duration of time while the wind turbine is off grid. In this configuration the energy storage system is capable of being resupplied by wind turbine operators at regular intervals, to avoid a loss of available energy. This may involve refuelling of Diesel generators or replacing or recharging of batteries.

A further embodiment of this invention includes providing information on the remaining energy capacity to the controller 19 and then providing this information over a communication system to operators 20. When the energy capacity (e.g., fuel level, battery state-of-charge) is approaching depletion, a communication message is sent to the operator 20 to provide information that the energy must be resupplied.

A further embodiment of this invention includes using the rotor of the wind turbine to provide electrical power for recharging of the energy storage system. The energy storage system may be of a type which is capable of being resupplied using electrical power, e.g., a battery system or fuel cell using hydrogen formed by electrolysis. In this way, the energy storage system provides power for operation of the wind turbine in the absence of grid power. Once the wind turbine is in operation, it may provide power back to the energy storage system to sustain the energy supply.

A further embodiment of this invention extends the previous embodiment by using the controller to monitor the remaining energy in the energy storage system and only operating the wind turbine when the energy supply is approaching depletion.

The energy storage system may be located physically within the wind turbine, outside and nearby the wind turbine, or at a location separate from the wind turbine and possibly serving a plurality of wind turbines at the same time.

In the following, particular advantages and technical effects according to embodiments of the present invention are described:

By using an energy storage system to actively control the orientation of the rotor in order avoid standstill vibrations while off-grid, there is significant savings in the amount of passive damping or vortex disrupting equipment needed. This saves cost and weight. Saving weight, in turn can have a knock-on effect of reducing costs and weight in other structural components. The energy storage system may be used to provide power for off-grid scenarios and the control strategy to operate such a system in an energy efficient way.

By accounting for the periods of time when the turbine is off grid this enables turbines within their existing designs and systems to avoid critical scenarios. Embodiments of this invention may significantly lower the risk of structural damage due to standstill vibrations during the lifetime of the wind turbine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of mitigating a vibration of a wind turbine not receiving power from a utility grid, the method comprising:
receiving power from an energy storage system of the wind turbine;
utilizing the power received from the energy storage system:
to detect a wind direction and
to adjust an orientation of a rotor axis of a rotor shaft, if it is determined that a criterion is satisfied, wherein the criterion comprises a relative orientation of a rotor axis direction and the detected wind direction;
the method further comprising:
detecting a wind speed, wherein the criterion further comprises that the wind speed is in a wind speed range, depending on the wind direction relative to the rotor axis direction, wherein plural wind speed ranges are defined in association with different orientations of the wind direction relative to the rotor axis direction, wherein the criterion further comprises that at least one respective wind speed range associated with a respective orientation is present, wherein the at least one respective wind speed range is defined in that the wind speed is greater than a threshold depending on at least one of the different orientations.

2. The method according to claim 1, wherein the criterion further comprises that rotor blades mounted at the rotor shaft are pitched to be in a feathered position or deviating from the feathered position by at most 20°.

3. The method according to claim 1, further comprising:
receiving power from the energy storage system for measuring, using one or more accelerometers and/or strain sensors and/or inclinometers, a strength of a vibration of one or more portions of the wind turbine,
wherein the criterion further comprises that the strength of the vibration is larger than a vibration strength threshold, depending on a wind speed range and/or an orientation.

4. The method according to claim 3,
wherein measuring the strength of the vibration comprises detecting a vibration level of a top of a wind turbine tower and/or a nacelle, and/or one or more blades,
the method further comprising:
filtering the measured strength of the vibration to extract a strength of a standstill vibration.

5. The method according to claim 1, wherein the energy storage system comprises a generator powered by a combustion engine being a Diesel motor, and/or a battery system and/or a fuel cell.

6. The method according to claim 1, further comprising:
determining a remaining energy capacity of the energy storage system;
sending information about the remaining energy capacity to an operator, if the remaining energy capacity is less than an energy threshold.

7. The method according to claim 1, further comprising:
recharging the energy storage system using energy provided by rotating the rotor shaft, via a wind turbine generator, if the remaining energy capacity is less than an energy threshold.

8. An arrangement for mitigating a vibration of a wind turbine not receiving power from a utility grid, the arrangement comprising:
an energy storage system of the wind turbine;
a wind direction sensor;
one or more vibration sensors;
a yawing system;
a processor,
wherein the arrangement is adapted to supply power received from the energy storage system:
to the wind direction sensor to detect a wind direction,
to the yawing system to adjust an orientation of a rotor axis of a rotor shaft if the processor determines that a criterion is satisfied, wherein the criterion comprises at least a relative orientation of a rotor axis direction and the detected wind direction, and
to detect a wind speed, wherein the criterion further comprises that the wind speed is in a wind speed range, depending on the wind direction relative to the rotor axis direction, wherein plural wind speed ranges are defined in association with different orientations of the wind direction relative to the rotor axis direction, wherein the criterion further comprises that at least one respective wind speed range associated with a respective orientation is present, wherein the at least one respective wind speed range is defined in that the wind speed is greater than a threshold depending on at least one of the different orientations.

9. A wind turbine, including the arrangement according to claim 8.

10. The method according to claim 1, wherein the criterion comprises that rotor blades mounted at the rotor shaft are pitched to be in a feathered position or deviating from the feathered position by at most 10°.

11. The method according to claim 1, wherein the criterion comprises that rotor blades mounted at the rotor shaft are pitched to be in a feathered position or deviating from the feathered position by at most 5°.

12. A method of mitigating a vibration of a wind turbine not receiving power from a utility grid, the method comprising:
receiving power from an energy storage system of the wind turbine;
providing plural wind speed ranges defined in association with different orientations of the wind direction relative to a rotor axis direction of a rotor axis of a rotor shaft, wherein at least one of the wind speed ranges of the plural wind speed ranges is defined in that wind speed is greater than a threshold for at least one orientation of the different orientations of the wind direction relative to the rotor axis direction;
detecting a wind direction and a wind speed;
determining that a criterion is satisfied, wherein the criterion is based on the detected wind speed, wind direction, and a level of the vibration, wherein the criterion includes that at least one of the wind speed ranges of the plural wind speed ranges associated with the respective orientation is present; and
adjusting an orientation of the rotor axis of the rotor shaft using the power received from the energy storage system of the wind turbine.

13. The method according to claim 12, wherein the criterion further comprises that rotor blades mounted at the rotor shaft are pitched to be in a feathered position or deviating from the feathered position by at most 20°.

14. The method according to claim 12, further comprising:
receiving power from the energy storage system for measuring, using one or more accelerometers and/or strain sensors and/or inclinometers, a strength of a vibration of one or more portions of the wind turbine,
wherein the criterion further comprises that the strength of the vibration is larger than a vibration strength threshold, depending on a wind speed range and/or an orientation.

15. The method according to claim 14,
wherein measuring the strength of the vibration comprises detecting a vibration level of a top of a wind turbine tower and/or a nacelle, and/or one or more blades,
the method further comprising:
filtering the measured strength of the vibration to extract a strength of a standstill vibration.

16. The method according to claim 12, wherein the energy storage system comprises a generator powered by a combustion engine being a Diesel motor, and/or a battery system and/or a fuel cell.

17. The method according to claim 12, further comprising:
determining a remaining energy capacity of the energy storage system;
sending information about the remaining energy capacity to an operator, if the remaining energy capacity is less than an energy threshold.

18. The method according to claim 1, further comprising:
recharging the energy storage system using energy provided by rotating the rotor shaft, via a wind turbine generator, if the remaining energy capacity is less than an energy threshold.

* * * * *